US005493340A

United States Patent [19]

Kim

[11] Patent Number: 5,493,340

[45] Date of Patent: Feb. 20, 1996

[54] CIRCUIT FOR DISPLAYING SCREEN CONTROL STATES OF A MONITOR

[75] Inventor: Tae Y. Kim, Suwon, Rep. of Korea

[73] Assignee: Samsung Electronics Co., Ltd., Suwon, Rep. of Korea

[21] Appl. No.: 282,800

[22] Filed: Jul. 29, 1994

[30] Foreign Application Priority Data

Sep. 10, 1993 [KR] Rep. of Korea .................. 1993-18175

[51] Int. Cl.[6] .............................. H04N 3/24; H04N 5/445

[52] U.S. Cl. ........................... 348/569; 348/634; 348/637

[58] Field of Search .................................... 348/569, 633, 348/634, 637; H04N 3/24, 5/445

[56] References Cited

U.S. PATENT DOCUMENTS 5,343,249 8/1994 Moon ...................................... 348/569

*Primary Examiner*—James J. Groody
*Assistant Examiner*—Glenton B. Burgess
*Attorney, Agent, or Firm*—Ladas & Parry

[57] ABSTRACT

A circuit for displaying on the screen a mode frequency and screen control states of a monitor by using OSD letters is disclosed. The circuit delays the R, G, B signals of the OSD IC for a predetermined time until the output signals from the pre-amplifier are completely blanked according to a blanking signal of the OSD IC, to prevent the data received from the video card from being displayed on the screen during displaying the OSD letters on the screen, connects a mixer at a post-stage of the pre-amplifier, and further applies the horizontal flyback signal derived from the horizontal retrace pulse of the monitor to the pre-amplifier so as to allow the OSD signal level of the OSD IC to have the same level as the video signal level of the pre-amplifier, thereby preventing the degradation of the input characteristics and the undesirable change of the colors.

5 Claims, 5 Drawing Sheets

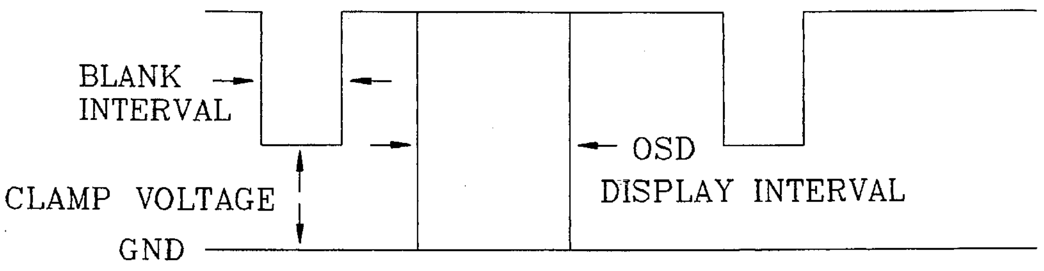
FIG.4D
FIG.4E
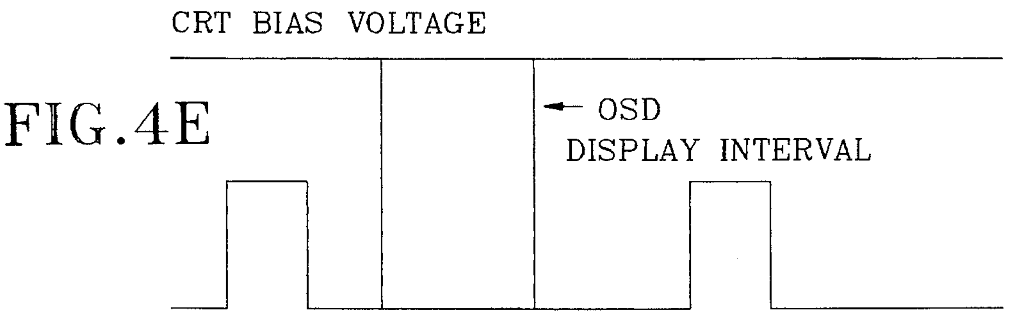
FIG.4F
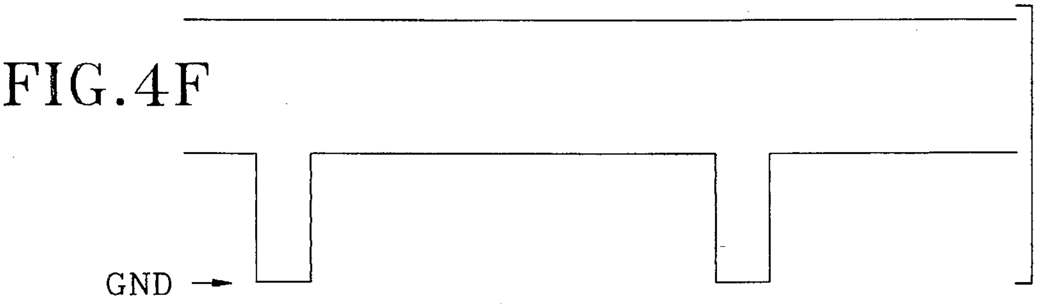
FIG.4G
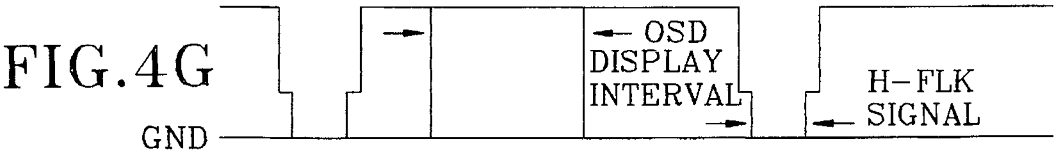
FIG.4H
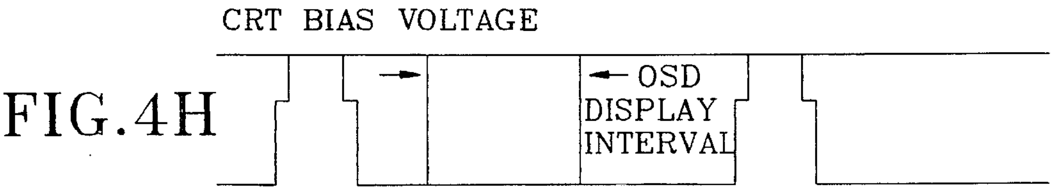

CIRCUIT FOR DISPLAYING SCREEN CONTROL STATES OF A MONITOR

BACKGROUND OF THE INVENTION

The present invention generally relates to a circuit for displaying screen control states of a monitor, wherein a video signal output from a video card is maintained to be equal to a voltage level of an on-screen-display (referred to as OSD hereinafter) signal by using a horizontal flyback signal, and the video signal and the OSD signal are controlled not to be overlapped with each other by using a blank signal.

In general, most monitors include light emitting diodes (referred to as LED hereinafter) for indicating (or displaying) function control states upon controlling the function keys to control screen states.

However, the monitors using the LEDs need a large space for arranging the LEDs thereon.

Further, since the LED display indicates only a selected screen mode, it can not display the screen control states finely, giving inconveniences in displaying the functions performed by more than two keys.

Accordingly, to solve these problems, Korean patent application No. 92-7980 discloses a technology for display screen control modes and screen control states selected by the key operations on the screen by using the OSD function.

That is, as shown in FIG. 1, when OSD letters are not displayed on the screen, R(red), G(green), B(blue) signals supplied from a video card 11 are applied to a pre-amplifier 15 through a mixer 14 to be amplified to a predetermined voltage level. The pre-amplified signal outputs from the pre-amplifier 15 are again inversely amplified to a voltage level suitable for driving a CRT (Cathode Ray Tube) and then applied to cathode electrodes of a CRT 17.

Alternatively, when the OSD letters are displayed on the screen, a blanking signal BLK and the R, G, B signals are supplied simultaneously from an OSD IC (integrated circuit) 12. At this moment, the blanking signal BLK is at the logic "high" state and transferred to a transistor Q1 through a diode D1 and a resistor R1, thus for turning on the transistor Q1. If the transistor 01 is turned on, a voltage level at a collector thereof becomes lower. Thus, while the OSD letters are displayed, the R, G, B signals supplied from the video card 11 are muted from an area on which the OSD letters are to be displayed.

Accordingly, the R, G, B signals supplied from the OSD IC 12 are applied to the pre-amplifier 15 through the mixer 14 and then pre-amplified to a predetermined voltage level. The pre-amplified signal outputs from the pre-amplifier 15 are again inversely amplified to a voltage level suitable for driving the CRT 17 by the amplifier 16 and applied to the cathode electrodes of the CRT 17 to display the OSD letters on the screen.

However, when adapting the above OSD device to a monitor, a manufacturer may encounter the following problems.

First, data displayed on the screen is generally a mixture of texts and complicated graphics. In this case, since the blanking signal BLK and the R, G, B signals are simultaneously supplied from the OSD IC 12, the R, G, B signals from the OSD IC 12 are applied to the mixer 14 before the blanking signal BLK from the OSD IC 12 mutes the R, G, B signals from the video card 11. Therefore, the R, G, B signals from the video card 11 are overlapped with the R, G, B signals from the OSD IC 12 at the beginning. Thus, the OSD letters are overlapped with the complicated graphic or text from the video card 11, thereby making a user confusing.

Second, the R, G, B signals supplied from the video card 11 are generally an analog signal lower than 1VP-P. Thus, when an additional circuit such as the mixer 14 is provided at a pre-stage of the pre-amplifier, the characteristics of the input signals are degraded.

Third, since the R, G, B signals supplied from the video card 11 are generally an analog signal lower than 1VP-P and the R, G, B signals from the OSD IC 12 are 5 voltage, the voltage level of R, G, B signals from the OSD IC 12 must be lowered to the level of the R, G, B signals from the video card 11 so as to maintain the voltage level of the R, G, B signals from the OSD IC 12 at the same level as that of the analog input voltage from the video card 11. Accordingly, the characteristics of the OSD display letters become degraded.

SUMMARY OF THE INVENTION

It is therefore an object of the present invention to provide a circuit for displaying screen control states of a monitor, wherein R, G, B signals from an OSD IC are delayed for a predetermined time so as to prevent the data received from a video card from being displayed on the screen while OSD letters are displayed on the screen.

It is another object of the present invention to provide a circuit for displaying screen control states of a monitor, wherein a mixer is arranged at a post-stage of a pre-amplifier, and a flyback signal derived from a horizontal retrace pulse of a monitor is applied to the pre-amplifier so as to allow the output level of the pre-amplifier to be maintained at the same level as the R, G, B signals from an OSD IC.

To achieve these and other objects, a circuit for displaying a mode frequency and screen control states of a monitor using OSD letters according to the present invention includes, pre-amplifying means for amplifying a signal output from a video card or blanking the signal output from the video card, in response to a logic signal applied to a blanking gate terminal thereof; OSD means for displaying on a screen mode frequency and screen control states using the OSD letters in accordance with R(red), G(green), B(blue) signals, while the output of said pre-amplifying means is blanked in response to a blanking signal applied to the blanking gate terminal thereof; buffer means for delaying the R, G, B signals from said OSD means for a predetermined time; mixer means for mixing the output of said pre-amplifying means and the output of said buffer means; amplifying means for inversely amplifying the output of said mixer means to a voltage suitable for driving a CRT (cathode ray tube); and bias means for De-coupling the output of said amplifying means and biasing a CRT voltage to a predetermined voltage to provide the biased CRT voltage to cathode electrodes of the CRT.

BRIEF DESCRIPTION OF THE DRAWINGS

The above and other objects, advantages and features of the present invention will be Bore apparent from the following detailed description taken with the attached drawings in which:

FIGS. 4A to 4H are operational timing diagrams of the circuit for displaying screen control states of a monitor according to the present invention.

DETAILED DESCRIPTION OF THE PREFERRED EMBODIMENT

Figure 1:
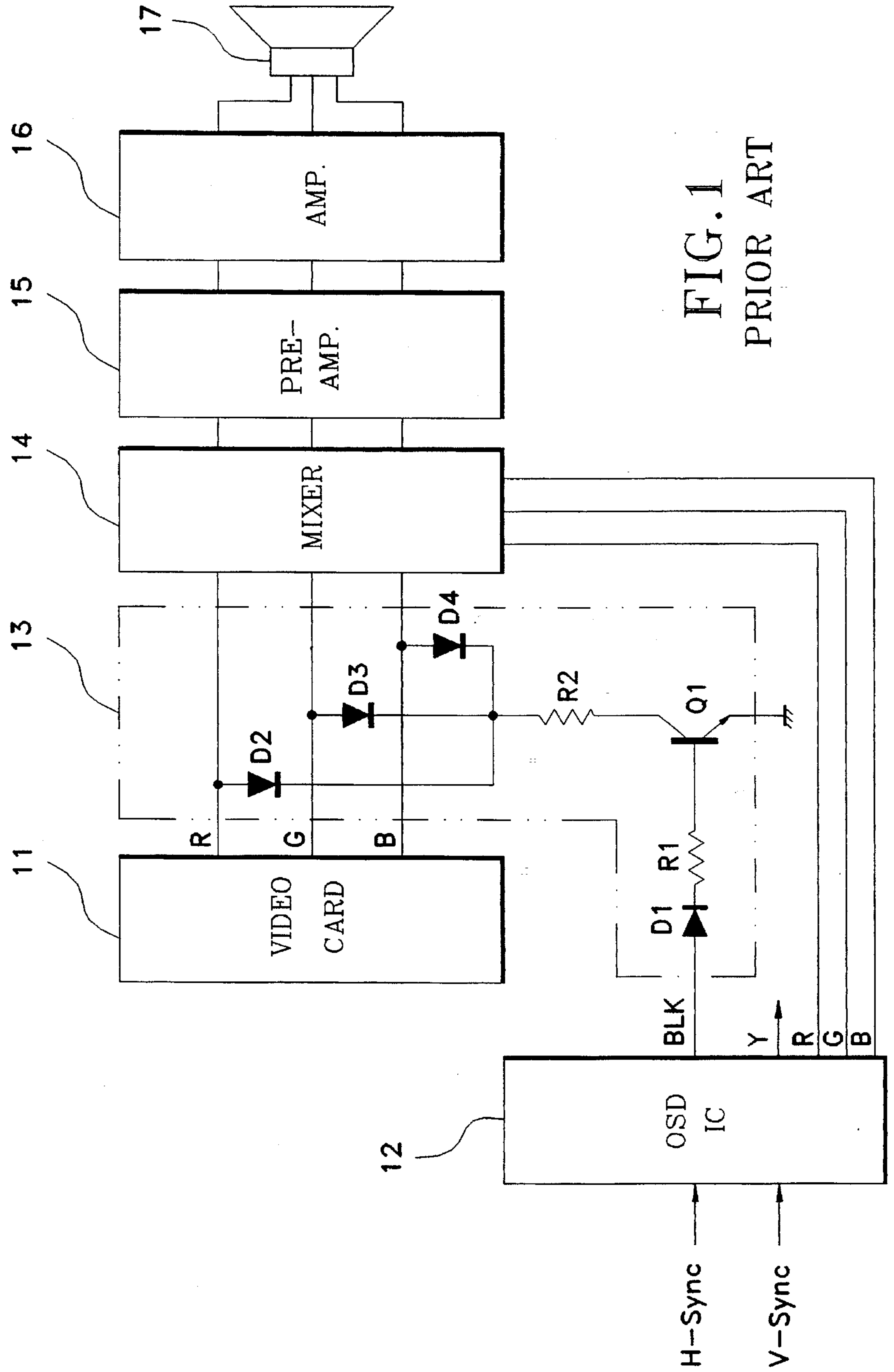
FIG. 1 PRIOR ART
FIG. 1 is a schematic block diagram of a circuit for displaying screen control states of a monitor according to the prior art.
Figure 2:
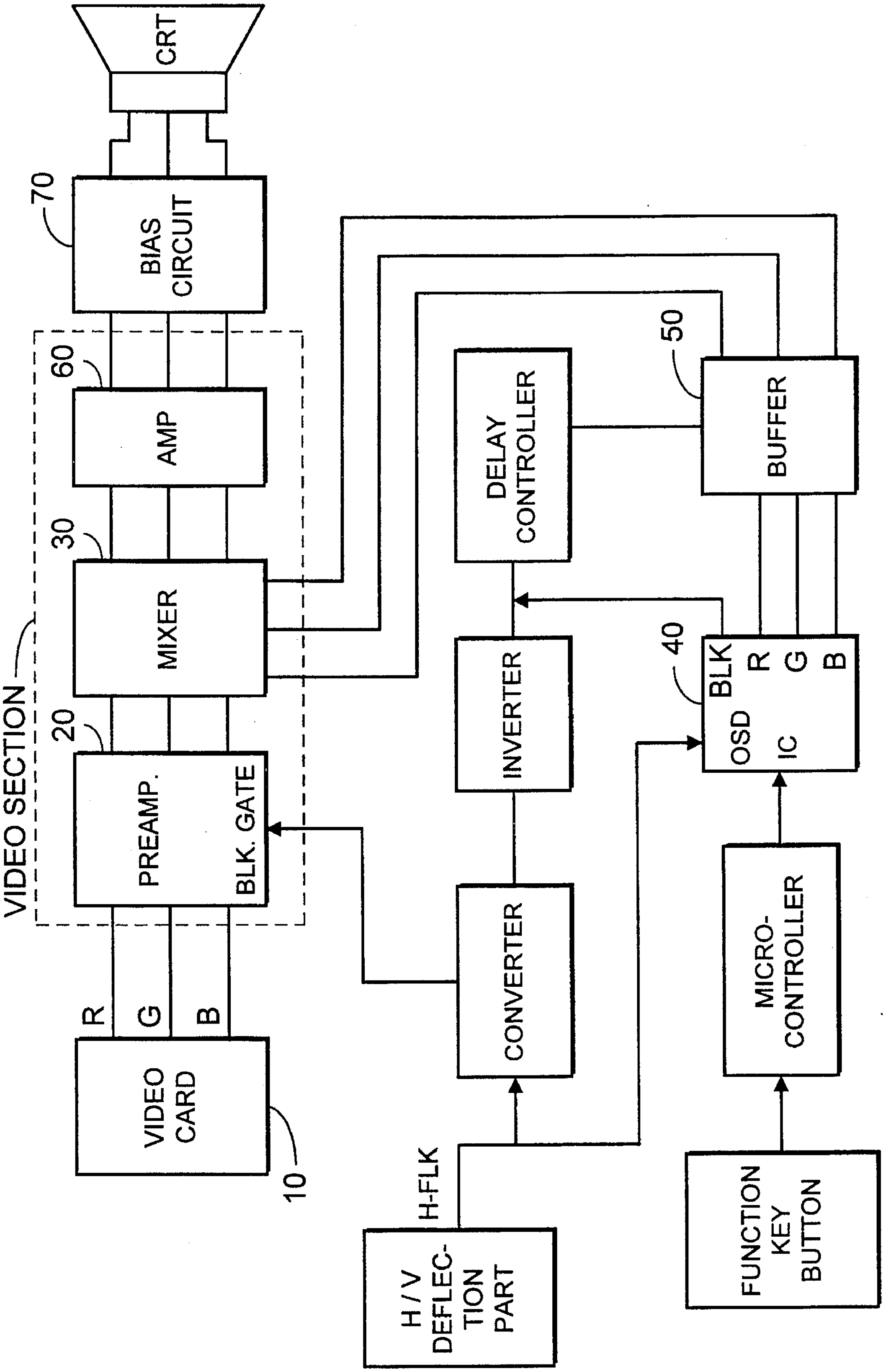
FIG. 2 is a schematic block diagram of a circuit for displaying screen control states of a monitor according to the present invention.

Referring to FIG. 2, a pre-amplifier 20 which amplifies the R, G, B signals generated from a video card 10 to a predetermined level includes a blanking gate terminal BLK-GATE to which a flyback signal H-FLK derived from a horizontal retrace pulse of a monitor and a blanking signal BLK from an OSD IC 40 are commonly connected.

It can be thus appreciated that a signal applied to the blanking gate terminal BLK-GATE of the pre-amplifier 20 controls the output of the pre-amplifier 20. That is, if a "low" signal is applied to the blanking gate terminal BLK-GATE, the output of the pre-amplifier 20 becomes zero voltage. Alternatively, if a "high" signal is applied to the blanking gate terminal BLK-GATE, the pre-amplifier 20 performs a normal operation of amplifying the video signal. Further, the output of the pre-amplifier 20 is connected to a mixer 30.

In the meantime, the R, G, B signal lines of the OSD IC 40 are connected to a buffer 50 and this buffer 50 delays the R, G, B signals for a predetermined time until the output signals of the pre-amplifier 20 are completely muted. Further, output terminals of the buffer 50 are connected to the mixer 30. The mixer 30 mixes the video signals amplified by the pre-amplifier 20 and the OSD signals delayed by the buffer 50. The output terminals of the mixer 30 are connected to an amplifier 60 and this amplifier 60 inversely amplifies the output signals of the mixer 30 to a voltage suitable for driving a CRT. The output terminals of the amplifier 60 are connected to cathode electrodes of the CRT through a bias circuit 70 which biases cathode voltages of the CRT to a predetermined level. Here, the pre-amplifier 20 may be embodied by using an IC, for instance, LM1205N manufactured by National Semiconductor company of U.S.A.

Figure 3:
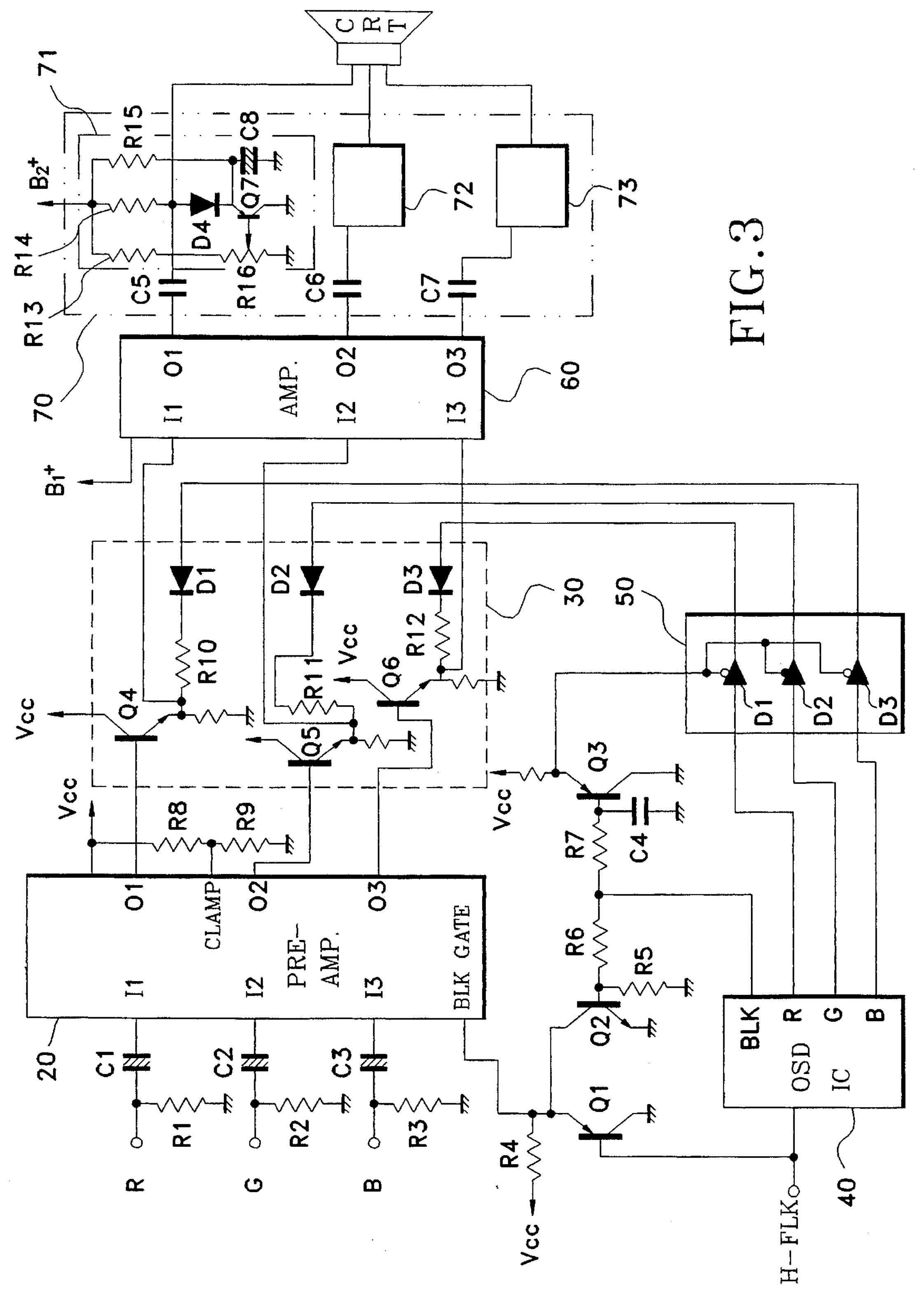
FIG. 3 is a detailed circuit diagram of FIG. 2.

Referring to FIG. 3 showing a detailed circuit diagram of FIG. 2, a transistor Q1 is turned on/off in response to the horizontal flyback signal H-FLK connected to a base thereof, An emitter of the- transistor Q1 is connected to the blanking gate terminal BLK-GATE in parallel to the power supply voltage Vcc. A transistor Q2 is turned on/off in response to the blanking signal BLK connected to a base thereof. A collector of the transistor Q2 is commonly connected to the emitter of the transistor Q1. The transistor Q1 is a PNP type and the transistor Q2 is a NPN type, wherein a collector of the transistor Q1 and an emitter of the transistor Q2 is connected commonly the ground.

Further, the video signal outputs from the pre-amplifier 20 has a DC voltage in a specific level with respect to a ground GND, which is called a "clamp voltage". The power supply voltage Vcc is voltage-divided by voltage-dividing resistors R8 and R9 to make a specific DC level of the clamp voltage. Accordingly, the video signals applied to the pre-amplifier 20 are amplified using the clamp voltage as a reference level.

Moreover, the buffer 50 includes tri-state buffers B1, B2 and B3 each receiving the R, G, B signals from the OSD IC 40, respectively. The respective control terminals of the tri-state buffers B1, B2 and B3 are commonly connected to a collector of a transistor Q3 which is turned on/off in response to the blanking signal BLK from the OSD IC 40. It should be noted that a capacitor C4 is connected between a base of the transistor Q3 and the ground to delay the output of the tri-state buffers B1, B2 and B3 for a predetermined time.

The mixer 30 includes transistors Q4, Q5 and Q6 of which bases are respectively connected to R, G, B signal output terminals 01, 02 and 03 of the pre-amplifier 20 and of which emitters are respectively connected to an input terminals I1, I2 and I3 of the amplifier 60. Further, emitters of the transistors Q4, Q5 and Q6 are respectively connected to the corresponding output terminals of the tri-state buffers B1, B2 and B3 of the buffer 50 via resistors R10, R11 and R12 and diodes D1, D2 and D3.

The resistors R10, R11 and R12 and the diodes D1, D2 and D3 have a function of adjusting the video signal outputs from the pre-amplifier 20 to the same level as the voltage level of the OSD signals from the buffer 50. In addition, the transistors Q4, Q5 and Q6 function as a buffer.

The signal outputs from the mixer 30 applied to the amplifier 60 are inversely amplified by the amplifier 60. Since a power supply voltage B1+ of the amplifier 60 is lower than a power supply voltage B2+ of the CRT, the output terminals of the amplifier 60 is connected to the bias circuit 70 which biases the CRT voltage to a predetermined voltage level.

The bias circuit 70 includes capacitors C5, C6 and C7 for the DC coupling, and first to third bias sections 71, 72 and 73. The first bias section 71 includes resistors R13, R14 and R15 connected in parallel to the power supply voltage B2+, a diode D4 connected to the resistors R14, and a transistor Q7 having an emitter connected to a junction node of the diode D4 and a capacitor C8 and a base connected to a variable resistor R16. The second and third bias sections 72 and 73 have the same configuration as that of the first bias section 71.

FIGS. 4A to 4H show operational waveforms at specific parts of the screen control state display circuit of a monitor according to the present invention.

In operation, the R, G, B signals generated from the video card 10 are applied to the pre-amplifier 20 and amplified to a predetermined voltage level. The signal outputs from the pre-amplifier 20 have a DC voltage with reference to the ground voltage GND and is called the "clamp voltage". The power supply voltage Vcc is voltage-divided by the voltage-dividing resistors R8 and R9 to generate the clamp voltage of a DC level. The video signals applied from the video card 10 to the pre-amplifier 20 are amplified from the clamp voltage as shown in FIG. 4A.

Figure 4A:
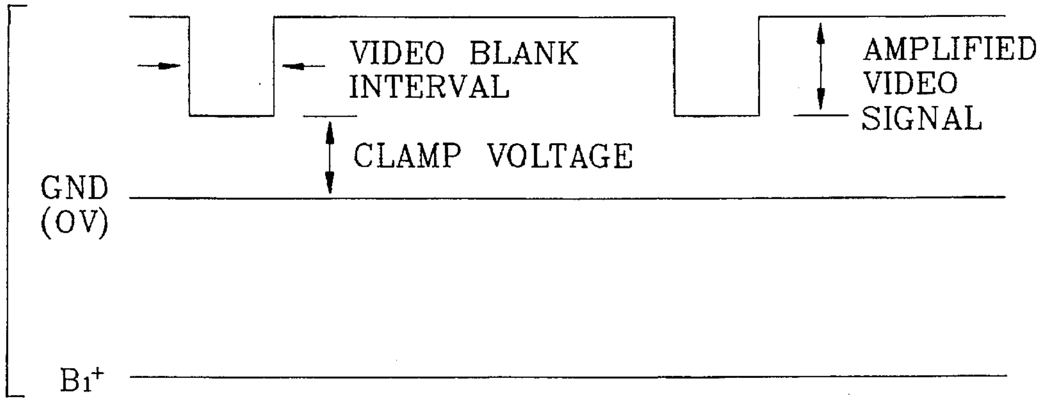
Figure 4B:
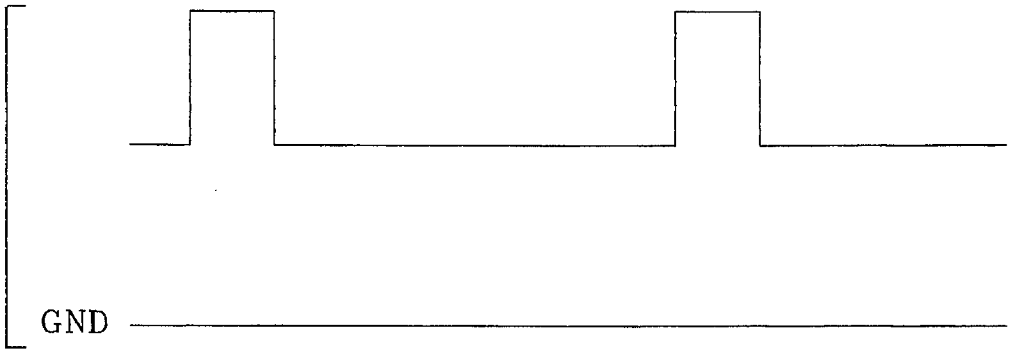

The waveform of FIG. 4A has a blanking interval for which the video signals are blanked. The signal outputs from the pre-amplifier 20 are applied to the amplifier 60 through the transistors Q4, Q5 and Q6 of the mixer 30 and inversely amplified to a voltage suitable for driving the CRT. The output of the amplifier 60 is inverted as shown in FIG. 4B. The output of the amplifier 60 are applied to the cathode electrodes of the CRT via the bias circuit 70 for performing the DC coupling and the CRT biasing.

Figure 4C:
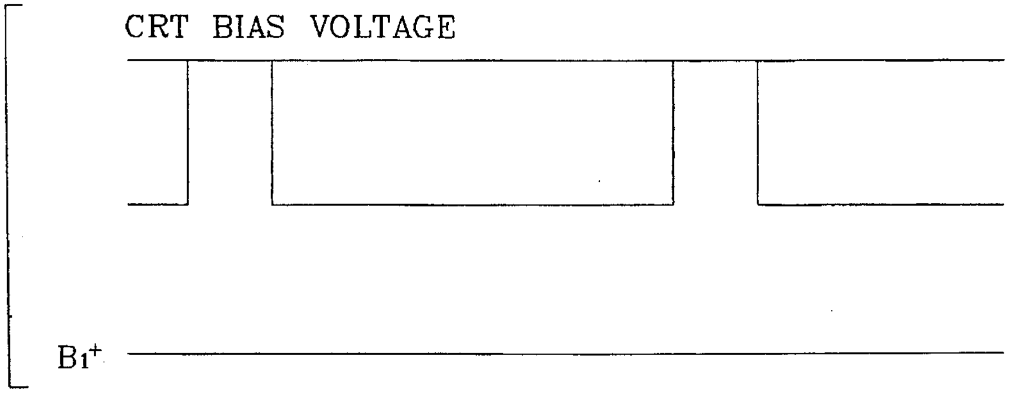

It is noted that since the power supply voltage B1+ of amplifier 60 is lower than a CRT bias voltage of the power supply voltage B2+, the output voltage of the bias circuit 70 appears as shown in FIG. 4C. Further, the R, G, B signals and the blanking signal BLK are simultaneously generated from the OSD IC 40. In operation, if the R, G, B signals are generated from the OSD IC 40, the blanking signal BLK is at the logic "high" level. Therefore, in order to blank the video data (i.e., R, G, B signals) generated from the video card 10 for the OSD letter display interval for which the OSD letters are displayed on the screen, the blanking signal BLK from the OSD IC 40 must be applied to the blanking gate terminal BLK-GATE of the pre-amplifier 20.

If the blanking signal BLK of the logic "high" level is generated, the transistor Q2 is turned on to provide the blanking gate terminal BLK-GATE with the logic "low" level. Then, the pre-amplifier 20 is disabled and the outputs thereof become zero voltage, thereby blanking the video signals. In practice, however, a specific time interval is lapsed until the output state is changed upon applying the logic "low" level to the blanking gate terminal BLK-GATE. Accordingly, the R, G, B signals from the OSD IC 40 are delayed by the tri-state buffers B1, B2 and B3 of the buffer 50 until the output of the pre-amplifier 20 is completely muted according to the blanking signal BLK from the OSD IC 40.

More specifically, the blanking signal BLK from the OSD IC 40 is applied to the blanking gate terminal of the pre-amplifier 20 through the transistor Q2 and, at the same time, to the base of the transistor Q3 through a resistor R7 and the capacitor C4. Since the collector of the transistor Q3 is connected to the control terminals of the tri-state buffers B1, B2 and B3 of the buffer 50, if the OSD IC 40 generates the blanking signal BLK of the logic "high", the tri-state buffers B1, B2 and B3 delay generating the outputs until the capacitor C4 is charged up.

As a result, the video data output from the pre-amplifier 20 is completely muted while the OSD letters are displayed, thus preventing the undesirable overlapping with the OSD letters.

Further, the R, G, B signals from the OSD IC 40 delayed by the buffer 50 for a predetermined time are applied to the mixer 30 through the diodes D1, D2 and D3 and the resistors R10, R11 and R12, The diodes D1, D2 and D3 and the resistors R10, R11 and R12 have a function of adjusting the video signal outputs from the pre-amplifier 20 to the same level as the voltage level of the output signals from the OSD IC 40. Since the pre-amplifier 20 has the clamp voltage of the DC voltage, the video signal output from the pre-amplifier 20 is amplified with reference to the clamp voltage and then applied to the mixer 30. The OSD signal of the OSD IC 40 is applied to the mixer 30 through the buffer 50 on the basis of zero voltage. The mixed output of the mixer 30 is shown in FIG. 4D.

If the output of the mixer 30 is inverted by the amplifier 60 and applied to the cathode electrodes of the CRT through the bias circuit 70, there occurs a voltage difference between the video signal of the amplifier 20 and the OSD signal of the OSD IC 40, as shown in FIG. 4E. It is noted that when considering with respect to the cathode bias voltage of the CRT, the video signal of the pre-amplifier 20 shown in FIG. 4E is lower than the video signal of FIG. 4.

Accordingly, the colors may change undesirably around the OSD letters being displayed. In order to prevent the undesirable change of the colors, the R, G, B signals from the pre-amplifier 20 must be adjusted to have the same level as the voltage level of the R, G, B signals from the OSD IC 40. That is, the output signal from the video card 10 has a blank interval for which the video data is blanked. During this blank interval, the output of the pre-amplifier 20 become zero voltage to make the same level as that of the R, G, B signals from the OSD IC 40.

In General, since a horizontal retrace interval is within the video blank interval, a voltage derived from the horizontal retrace pulse is applied to the blanking gate terminal BLK-GATE through the transistor Q1, The voltage derived from the horizontal retrace pulse is called the "horizontal flyback signal" H-FLK, which is also applied to the OSD IC 40 to control the generation of the OSD signal and to determine the horizontal position of the OSD letters to be displayed, As shown in FIG. 4F, if the horizontal flyback signal H-FLK of the logic "low" is applied, the transistor Q1 is turned on supplying the blanking gate terminal BLK-GATE of the pre-amplifier 20 with the logic "low" level. Alternatively, if the horizontal flyback signal H-FLK of the logic "high" is applied, the transistor Q1 is turned off providing the blanking gate terminal BLK-GATE of the pre-amplifier 20 with the logic "high" level.

Therefore, the blanking gate terminal BLK-GATE of the pre-amplifier 20 is provided with the horizontal flyback signal H-FLK of the logic "low" during the video blank interval, so as to allow the output of the pre-amplifier 20 to become zero voltage. Then, even if the OSD signal of the OSD IC 40 is mixed at the mixer 30, the same reference level of zero voltage will be given as shown in FIG. 4G.

Further, the output of the mixer 30 shown in FIG. 4G which is applied to the amplifier 60 is inversely amplified at the same voltage level (GND) and then applied to the cathode electrodes of the CRT through the bias circuit 70.

Accordingly, as shown in FIG. 4H, when considering with respect to the cathode bias voltage of the CRT, the output voltage level is not changed either when the normal video signal is generated or when the R, G, B signals of the OSD IC 40 are mixed. Accordingly, the undesirable change of the colors occurred around the displayed OSD letters is prevented.

As described above, the screen control state display circuit of a monitor according to the present invention delays the R, G, B signals of the OSD IC for a predetermined time until the output signals from the pre-amplifier 20 are completely blanked according to the blanking signal BLK of the OSD IC, to prevent the data received from the video card from being displayed on the screen during displaying the OSD letters on the screen. Further the circuit connects a mixer to a post-stage of the pre-amplifier, and applies the horizontal flyback signal derived from the horizontal retrace pulse of the monitor to the pre-amplifier so as to allow the OSD signal level of the OSD IC to have the same level as the video signal level of the pre-amplifier, thereby preventing the degradation of the input characteristics and the undesirable change of the colors.

More particularly, being readily adaptable for an existing monitor circuit, the inventive screen control state display circuit is compatible with the already existing monitors, thus having an advantage of cutting down the costs.

What is claimed is:

1. A circuit for displaying mode frequencies and screen control states of a monitor using OSD (on-screen-display) letters, comprising:

means for generating a blanking signal having a voltage at either a first logic level or a second logic level;

pre-amplifying means having a blanking gate terminal for receiving said blanking signal and for amplifying a signal output from a video card when said blanking signal received at said blanking gate terminal is at said first logic level, or blanking the signal output from the video card when said blanking signal received at said blanking gate terminal is at said second logic level;

OSD means for displaying on a screen the mode frequencies and the screen control states using the OSD letters in accordance with R (red), G (green), B (blue) signals, while the output of said pre-amplifying means is blanked in response to said blanking signal at said second logic level;

buffer means coupled to said OSD means for delaying the R, G, B signals form said OSD means for predetermined time;

mixer means for mixing the output of said pre-amplifying means and the output of said buffer means to generate a mixer output signal;

amplifying means for inversely amplifying said mixer output signal to a voltage signal suitable for driving a CRT (cathode ray tube); and bias means for DC-coupling the output of said amplifying means and biasing a CRT voltage to a predetermined voltage to provide the biased CRT voltage to cathode electrodes of the CRT.

2. A circuit as claimed in claim 1 including voltage supply means for supplying to said pre-amplifying means a clamp voltage of a constant predetermined value with respect to a ground voltage, wherein said pre-amplifying means amplifies the signal output from the video card with respect to said clamp voltage.

3. A circuit as claimed in claim 2 wherein said predetermined value of said clamp voltage is derived by means of resistors configured as a voltage divider for proportionally dividing the voltage of said voltage supply means.

4. A circuit as claimed in claim 1, wherein said blanking gate terminal of said pre-amplifying means further receives a horizontal flyback signal derived from a horizontal retrace pulse generated by said monitor to allow the output voltage of said pre-amplifying means to be a substantial voltage, and to allow the video signal output from said preamplifier to have the same level as the R, G, B signals supplied from said OSD means.

5. A circuit as claimed in claim 1, wherein said buffer means comprises:

a capacitor for delaying the blanking signal output from said OSD means for a predetermined time;

a plurality of tri-state buffers receiving the R, G, B signals from said OSD means; and a transistor having a base connected to said capacitor and a collector, commonly connected to control terminals of said tri-state buffers.

* * * * *